United States Patent
Ghorband et al.

(10) Patent No.: US 11,711,012 B2
(45) Date of Patent: Jul. 25, 2023

(54) SYNCHRONOUS CONVERTER FOR USE WITH REVERSE CURRENT PROTECTION DIODE

(71) Applicant: Allegro MicroSystems, LLC, Manchester, NH (US)

(72) Inventors: Vishal Ghorband, Grantham, NH (US); George P. Humphrey, Merrimack, NH (US)

(73) Assignee: Allegro MicroSystems, LLC, Manchester, NH (US)

( * ) Notice: Subject to any disclaimer, the term of this patent is extended or adjusted under 35 U.S.C. 154(b) by 179 days.

(21) Appl. No.: 17/333,353

(22) Filed: May 28, 2021

(65) Prior Publication Data

US 2022/0385169 A1    Dec. 1, 2022

(51) Int. Cl.
| | |
|---|---|
| *H02M 1/32* | (2007.01) |
| *H02M 1/08* | (2006.01) |
| *H02M 1/36* | (2007.01) |
| *H02M 3/158* | (2006.01) |

(52) U.S. Cl.
CPC .............. *H02M 1/32* (2013.01); *H02M 1/08* (2013.01); *H02M 1/36* (2013.01); *H02M 3/158* (2013.01)

(58) Field of Classification Search
CPC ............ H02M 1/32; H02M 1/08; H02M 1/36; H02M 3/1582
See application file for complete search history.

(56) References Cited

U.S. PATENT DOCUMENTS

| | | | |
|---|---|---|---|
| 6,984,967 | B2 | 1/2006 | Notman |
| 7,834,603 | B2 | 11/2010 | Mangtani et al. |
| 9,285,812 | B2 | 3/2016 | Wibben et al. |
| 9,379,708 | B2 | 6/2016 | Martin et al. |
| 9,425,785 | B1 | 8/2016 | Wibben |
| 9,537,383 | B1 | 1/2017 | Wibben |
| 9,621,036 | B2 | 4/2017 | Wibben |
| 9,621,041 | B2 | 4/2017 | Sun et al. |
| 9,641,070 | B2 | 5/2017 | Wibben |
| 9,774,257 | B2 | 9/2017 | Wibben et al. |
| 9,781,789 | B1 | 10/2017 | Lee et al. |
| 10,110,128 | B2 | 10/2018 | Raval et al. |
| 10,291,125 | B2 | 5/2019 | Ravel et al. |
| 10,367,500 | B2 | 7/2019 | Wibben |
| 10,412,797 | B2 | 9/2019 | Lee |

(Continued)

FOREIGN PATENT DOCUMENTS

CN         212305142 U  *  1/2021

*Primary Examiner* — Kyle J Moody
*Assistant Examiner* — Jye-June Lee
(74) *Attorney, Agent, or Firm* — Daly, Crowley, Mofford & Durkee, LLP

(57) ABSTRACT

A converter to convert an input voltage into a regulated output current for supplying a load includes a reverse current protection diode having an anode coupled to the input voltage and a cathode, an energy storage element coupled to the cathode of the reverse current protection diode, a high side transistor coupled to the energy storage element and responsive to a high side control signal, and a low side transistor coupled to the energy storage element and responsive to a low side control signal. A controller is configured to generate the high side control signal and the low side control signal such that the low side transistor is enabled and the high side transistor is disabled during a pre-regulation interval.

27 Claims, 10 Drawing Sheets

(56) References Cited

U.S. PATENT DOCUMENTS

2012/0206121 A1* 8/2012 Evans .................. H02M 3/156
  323/288
2015/0145439 A1* 5/2015 Szolusha ................ H05B 45/14
  315/307

* cited by examiner

SYNCHRONOUS CONVERTER FOR USE WITH REVERSE CURRENT PROTECTION DIODE

CROSS-REFERENCE TO RELATED APPLICATIONS

Not Applicable.

FIELD

This disclosure relates generally to synchronous converters and, more particularly, to a synchronous converter that prevents charge transfer from the converter output to input.

BACKGROUND

As is known, electrical converters, or regulators take various forms, or topologies to convert energy from an input supply to generate a regulated output using an energy storage device and one or more switches, often in the form of Metal Oxide Semiconductor Field Effect Transistors (MOSFETs). Converter topologies are selected to suit particular application requirements and include, for example, Boost converters in which the output voltage is higher than the input voltage, Buck converters in which the output voltage is lower than the input voltage, and Buck Boost converters in which the output voltage can be lower or higher than the input voltage, to name a few.

Switching converters can be operated asynchronously, in which case a rectifying diode is used to control current flow. Such converters are sometimes referred to as non-synchronous. Other converters, referred to as synchronous converters, use a transistor in place of the rectifying diode to control current flow. Synchronous converters, although generally more complex in implementation than asynchronous converters, provide higher efficiency due to the lower losses associated with the synchronous switch as compared to use of a rectifying diode and the ability to achieve optimal current control. The higher efficiencies achievable with synchronous converters are particularly useful in battery powered applications that have high power loads and require high efficiency.

Some converter applications employ a reverse current protection diode in order to protect the power supply. For example, connecting a supply such as a battery with reversed connections could cause damaging currents to flow to the battery. By coupling a diode in series with the power supply, if the supply were installed backwards, the diode would be reverse-biased and prevent current flow to the supply.

Although such a reverse current protection diode can protect the power supply in case of a reverse connection, it will not prevent current flow to the converter input (e.g., to an input capacitor) under conditions giving rise to such current flow. Such reverse current flow can cause undesirable voltage spikes on the input voltage. For example, under certain conditions (e.g., when the converter output capacitor is "pre-charged"), there can be a transfer of charge from the output capacitor to the input capacitor. One way to minimize the effects of such a transfer of charge is to use a relatively large input capacitor. However, this solution suffers from increased cost and space requirements.

SUMMARY

Described herein are circuits and methods for controlling a synchronous converter during a pre-regulation interval in a manner that prevents reverse current flow from the converter output to input. In general, the converter includes a high side switch, or synchronous switch and a low side switch and switch control signals are generated such that the high side switch is disabled during the pre-regulation interval. Once the pre-regulation interval is complete, the output voltage is at a level that would not result in a reverse current flow and the converter is transitioned to a synchronous mode of operation in order to thereby achieve the efficiency benefits of synchronous operation.

According to the disclosure, a converter to convert an input voltage into a regulated output current for supplying a load includes a reverse current protection diode having an anode coupled to the input voltage and a cathode, an energy storage element coupled to the cathode of the reverse current protection diode, a high side transistor coupled to the energy storage element and responsive to a high side control signal, and a low side transistor coupled to the energy storage element and responsive to a low side control signal. A controller is configured to generate the high side control signal and the low side control signal, wherein the low side transistor is enabled and the high side transistor is disabled during a pre-regulation interval.

Features may include one or more of the following individually or in combination with other features. The controller is further configured to enable the high side transistor during a synchronous operational mode following the pre-regulation interval. The controller can be further configured to generate a signal indicative of completion of the pre-regulation interval. The controller can further include a high side gate driver to generate the high side control signal in response to the signal indicative of completion of the pre-regulation interval. In embodiments, the controller can include a soft start circuit configured to generate a soft start signal and wherein the soft start circuit is configured to establish the pre-regulation interval. The controller can be responsive to the soft start signal to generate the high side control signal and the low side control signal. The controller can further include an error amplifier having a first input coupled to receive the soft start signal, a second input coupled to receive a feedback signal indicative of the output current, and an output at which a COMP signal is generated for use by the controller to generate the high side control signal and the low side control signal. In embodiments, the soft start circuit can include a counter and a digital-to-analog converter, wherein the counter is responsive to a soft start selection signal and generates a count signal coupled to the digital-to-analog converter, and wherein the soft start signal is provided at an output of the digital-to-analog converter. The soft start selection signal can be user programmable. In embodiments, the controller can be configured to generate the high side control signal and the low side control signal based on a selected one of a Boost topology or a Buck Boost topology. The load can be configurable between a first configuration for which the Boost topology is selected or a second configuration for which the Buck Boost topology is selected. In embodiments, the controller can include a timer configured to establish the pre-regulation interval. In embodiments, the controller can include a comparator having a first input coupled to a regulation reference voltage, a second input coupled to receive a signal indicative of the output current, and an output at which a comparator output signal is provided, wherein the comparator output signal is configured to establish the pre-regulation interval.

Also described is a controller configured to control a high side transistor and a low side transistor of a converter that converts an input voltage into a regulated output current. The controller includes a switch control circuit having a high side gate driver to generate a control signal for the high side transistor and a low side gate driver to generate a control signal for the low side transistor and a circuit configured to establish a pre-regulation interval during which the high side gate driver is disabled in order to thereby disable the high side transistor.

Features may include one or more of the following individually or in combination with other features. The controller is further configured to enable the high side transistor during a synchronous operational mode following the pre-regulation interval. The circuit can be further configured to generate a signal indicative of completion of the pre-regulation interval for coupling to the high side gate driver. In embodiments, the circuit can include a soft start circuit configured to generate a soft start signal to establish the pre-regulation interval. The switch control circuit can further include an error amplifier having a first input coupled to receive the soft start signal, a second input coupled to receive a feedback signal indicative of the output current, and an output at which a COMP signal is generated for use by the switch control circuit to generate the high side control signal and the low side control signal. In embodiments, the soft start circuit can include a counter and a digital-to-analog converter, wherein the counter is responsive to a soft start selection signal and generates a count signal coupled to the digital-to-analog converter, and wherein the soft start signal is provided at an output of the digital-to-analog converter. The soft start selection signal can be user programmable. In embodiments, the circuit can include a timer configured to establish the pre-regulation interval. In embodiments, the circuit can include a comparator having a first input coupled to a regulation reference voltage, a second input coupled to receive a signal indicative of the output current, and an output at which a comparator output signal is provided, wherein the comparator output signal is configured to establish the pre-regulation interval.

Also described is a method for controlling a synchronous converter having a high side switch and a low side switch for converting an input voltage to a regulated converter output. The method includes enabling the low side switch during a pre-regulation interval corresponding to the converter output not being in a regulation condition, disabling the high side switch during the pre-regulation interval, determining completion of the pre-regulation interval, and enabling the high side switch based on the determination of the completion of the pre-regulation interval.

Features may include one or more of the following individually or in combination with other features. Disabling the high side switch during the pre-regulation interval can include disabling a gate driver that generates a control signal for the high side switch. Determining completion of the pre-regulation interval can include using a soft start circuit. Determining completion of the pre-regulation interval can include using a timer. Determining completion of the pre-regulation interval can include using a comparator configured to compare a regulation reference voltage to the regulated converter output.

DESCRIPTION OF THE DRAWINGS

The foregoing features may be more fully understood from the following description of the drawings. The drawings aid in explaining and understanding the disclosed technology. Since it is often impractical or impossible to illustrate and describe every possible embodiment, the provided figures depict one or more illustrative embodiments. Accordingly, the figures are not intended to limit the scope of the broad concepts, systems and techniques described herein. Like numbers in the figures denote like elements.

DETAILED DESCRIPTION

Figure 1:
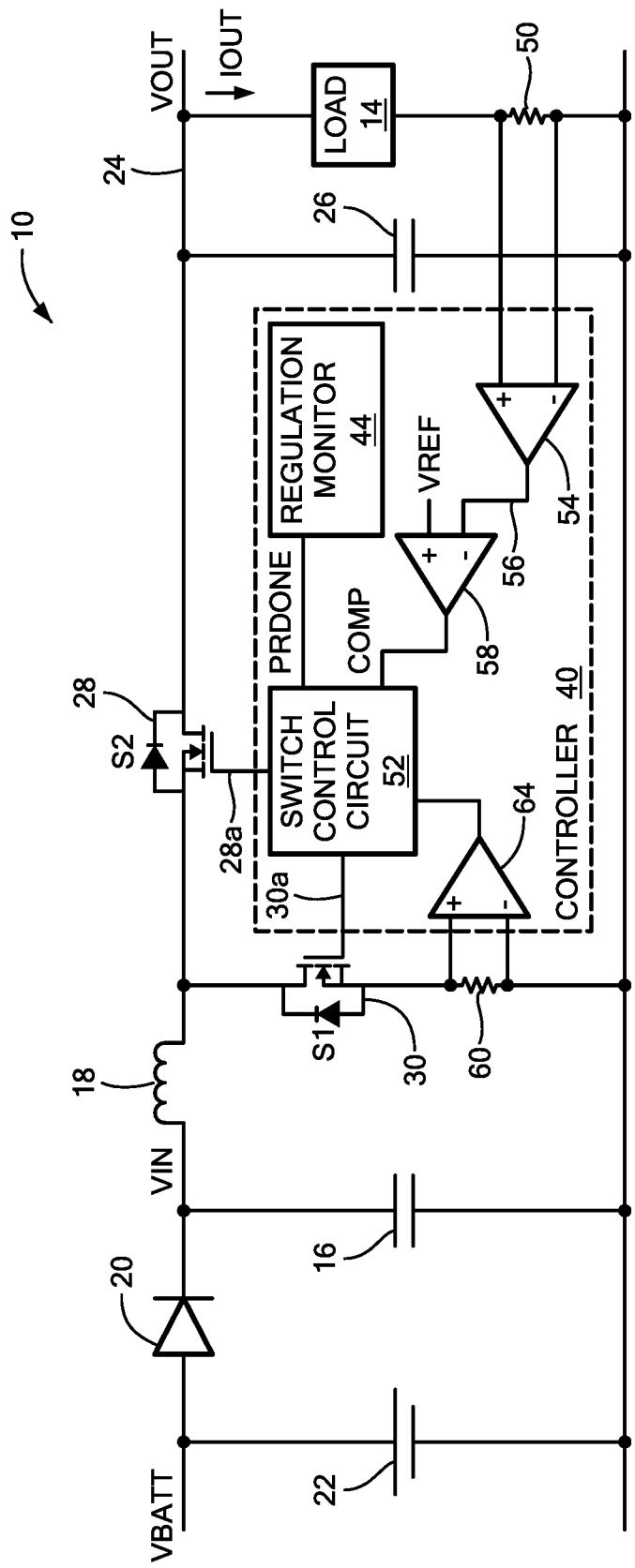
FIG. 1 is a simplified block diagram of a converter including a reverse current protection diode and a controller according to the disclosure.

Referring to FIG. 1, a synchronous DC-DC converter 10 is configured to convert an input voltage VBATT provided by a power supply, such as a battery 22, into a regulated output 24 at which a regulated output current IOUT and/or a regulated output voltage VOUT is provided for supplying a load 14. A reverse current protection diode 20 can be coupled between the power supply 22 and an energy storage element 18 in order to prevent current from flowing from the converter output 24 to the supply 22 (i.e., to prevent "reverse current"). To this end, diode 20 has an anode coupled to the supply voltage VBATT and a cathode coupled to the energy storage element 18.

Converter 10 includes energy storage element 18, here an inductor, and one or more switches 28, 30 generally in the form of MOSFETs, such as the illustrated NMOS FETs. A high side transistor, or switch 28 is coupled to energy storage element 18 and responsive to a high side control signal 28a and a low side transistor, or switch 30 is coupled to energy storage element 18 and is responsive to a low side control signal 30a.

A controller 40 is configured to generate the high side control signal 28a and the low side control signal 30a. Controller 40 is powered by an input voltage VIN across an input capacitor 16. Because input voltage VIN is on the cathode side of the diode 20, a reverse current could adversely affect and even damage controller 40. Thus, although diode 20 protects the power supply 22 from a reverse current flow, it does not protect controller 40.

According to the disclosure, controller 40 generates the high side control signal 28a and the low side control signal 30a such that, during a pre-regulation interval, the low side transistor 30 is enabled and the high side switch 28 is disabled. Pre-regulation interval is used herein to describe a time interval, or duration when the output 24 is not within a specified regulation range. In general, the pre-regulation interval corresponds to any interval when conditions are such that a reverse current could flow from the converter output 24 to the input capacitor 16.

With this arrangement, during the pre-regulation interval, converter 10 operates in an asynchronous, or non-synchronous mode and the body diode of the high side switch 30 prevents reverse current flow, even under conditions otherwise giving rise to a reverse current. For example, when the converter 10 is in a pre-biased condition (e.g., output capacitor 26 is in a pre-charged state) in which the output voltage VOUT is greater than the input voltage VIN, current could flow from the output 24 to input capacitor 16 if there were a path for such reverse current flow. However, disabling the high side switch 28 under such conditions prevents the reverse current flow since there is no path through the reverse-biased body diode of switch 28.

Following the pre-regulation interval, controller 40 enables the high side transistor 28 to commence synchronous operation. Since the converter 10 is in regulation when the high side switch is enabled, the output voltage level is such that there is no reverse current flow. In the synchronous mode of operation, efficiency benefits of operating switches 28, 30 in a synchronous fashion are realized.

Various circuitry and techniques can be used to control switches 28, 30 such that during the pre-regulation interval, the low side transistor 30 is enabled and the high side transistor 28 is disabled and, following completion of the pre-regulation interval, both switches 28, 30 are enabled for synchronous operation. In general, converter 10 includes a mechanism to detect when converter 10 is in regulation (i.e., when the pre-regulation interval is complete) and to generate a signal to indicate completion of the pre-regulation interval. In FIG. 1, a regulation monitor 44 is configured to monitor when converter 10 is in regulation and to generate a PRDONE signal indicative of completion of the pre-regulation interval. Various circuitry and techniques are possible for implementing regulation monitor 44. Example implementations of regulation monitor 44 are shown in connection with FIGS. 1A, 1B, and 1C.

Converter 10 can have various topologies capable of synchronous operation. By way of non-limiting examples, converter 10 can be a Boost converter, a Buck Boost converter, or a SEPIC converter. In embodiments, controller 40 is configured to generate the high side control signal 28a and the low side control signal 30a based on a selected one of a Boost topology or a Buck Boost topology. Further, the load 14 can be configurable between a first configuration for which the Boost topology is selected or a second configuration for which the Buck Boost topology is selected, as described below in connection with FIGS. 3 and 4.

Various features, alternatives, and/or modifications of converter 10 are possible to suit particular application requirements while still benefitting from the described switch control. For example, the regulated output 24 can be a regulated voltage VOUT and/or a regulated current IOUT. Switch control can be based on current mode control, voltage mode control, or a combination of the two.

Converter 10 includes a switch control circuit 52 with which the high side control signal 28a and the low side control signal 30a are generated. The switch control signals 28a, 30a are generated in response to one or more feedback and/or feedforward signals depending on the converter topology and control methodology. Switch control circuit 52 can include various features and arrangements and, in general, includes circuitry to independently generate the high side control signal 28a and the low side control signal 30a, such as a high side gate driver and low side gate driver as shown in the example embodiment of FIG. 3.

Example converter 10 is a constant current converter operated with current mode control. To this end, a load current sense resistor 50 can be coupled in series with the load 14 and a current sense amplifier 54 can have inputs coupled across the sense resistor 50, as shown. An error amplifier 58 can have a first input coupled to an output of the current sense amplifier 54 at which a load current feedback signal 56 is provided and a second input coupled to receive a reference voltage VREF. A signal provided by the error amplifier 58 (i.e., COMP) can be coupled to switch control circuit 52 for use in generating the high side control signal 28a and the low side control signal 30a with duty cycles suitable to provide the desired regulated output.

In order to implement an inner control loop and slope compensation, a further sense resistor 60 can be coupled in series with low side switch 30 and an inner control loop amplifier 64 can have inputs coupled across the sense resistor 60, as shown. The inner control loop can detect peak current through low side switch 30 to establish a duty cycle for the converter and cycle-by-cycle current limit and further can implement slope compensation to prevent harmonic oscillations at certain duty cycles. An output signal of inner control loop amplifier 64 can be coupled to the switch control circuit 52 for use in generating control signals 28a, 30a.

Figure 1A:
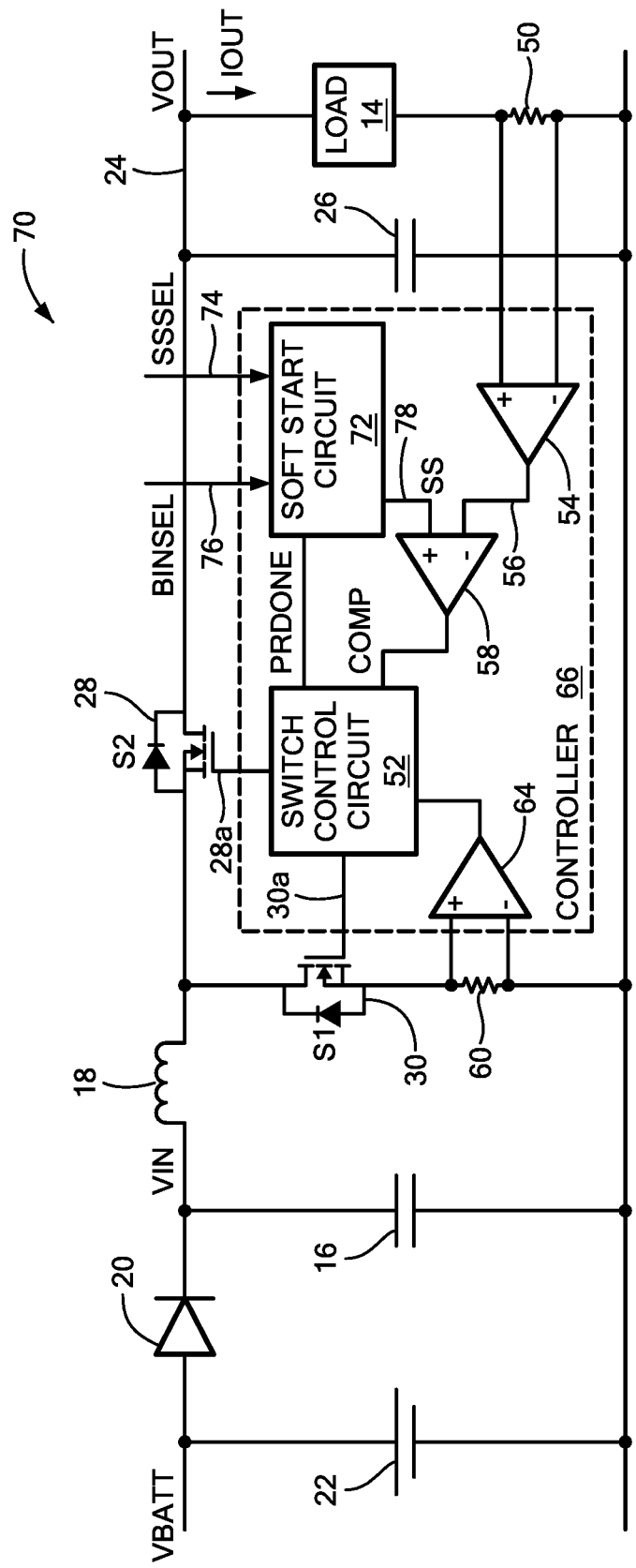
FIG. 1A is a simplified block diagram of an embodiment of the converter of FIG. 1 according to the disclosure.

Referring also to FIG. 1A in which like elements are labeled with like reference numbers, a converter 70 includes a controller 66 having a soft start feature with which regulation can be monitored. With the arrangement of FIG. 1A, the pre-regulation interval during which the high side switch 28 is disabled is established by a soft start circuit 72. Converter 70 can be substantially similar to converter 10 except that regulation monitor 44 (FIG. 1) is implemented using the soft start feature.

Soft start circuit 72 is responsive to a soft start selection signal SSSEL 74 and to a regulation control signal BINSEL 76 and is configured to generate a soft start signal SS 78. The soft start signal 78 provides a reference voltage input to error amplifier 58 so that the error amplifier compares the load current feedback signal 56 to the soft start signal 78.

As will be explained in connection with the example embodiment of FIG. 4, in some embodiments, soft start circuit 72 can be implemented using a counter and a digital-to-analog converter (DAC). However, it will be appreciated by those of ordinary skill in the art that various other circuitry and methodologies can be used to implement a so-called soft start feature.

In operation, the soft start circuit 72 operates to gradually increase the soft start signal 78 in order to thereby cause the output current IOUT to increase gradually, as is desirable in order to prevent large inrush currents from the power supply 22 and output voltage overshoot. In this way, the controller 66 uses the soft start signal 78 to generate the high side switch control signal 28a and the low side switch control signal 30a.

Once the output 24 is within a specified regulation range, the soft start interval can be considered complete. Soft start circuit 72 can generate a PRDONE signal indicative of completion of the soft start interval which, in the example embodiment, coincides with completion of the pre-regulation interval.

The soft start selection signal 74 can be a preset or predetermined or programmable signal by which the duration of the soft start interval can be selected. For example, in some embodiments, the soft start selection signal 74 can be selected from between two or more possible durations, such as from among four durations ranging between 5 ms to 20 ms. The regulation control signal 76 can be a selectable (e.g., programmable) input signal with which the converter output range (e.g., output current IOUT) can be chosen. For example, in embodiments, the regulation control signal 76 can be selected from among four levels corresponding to four respective scale factors of the input voltage for generating the output current IOUT to meet particular application and load requirements.

Figure 1B:
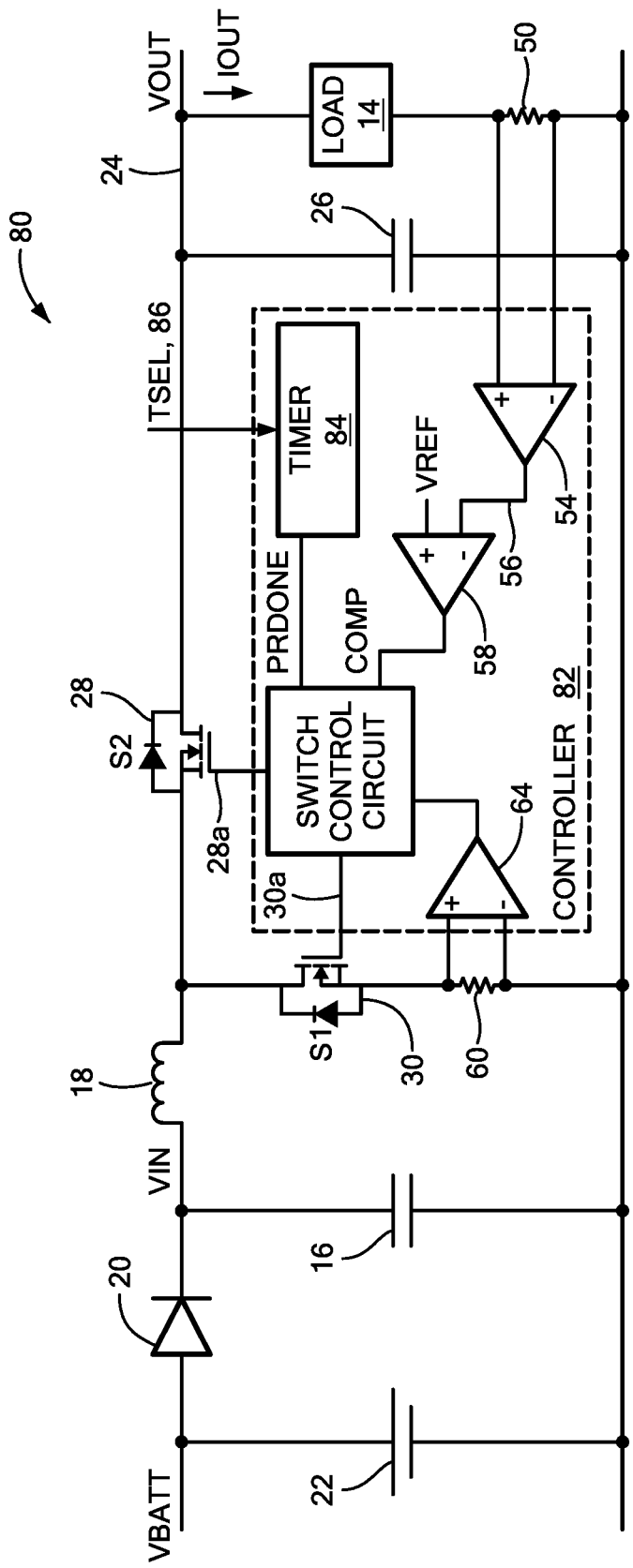
FIG. 1B is a simplified block diagram of an embodiment of the converter of FIG. 1 according to the disclosure.

Referring also to FIG. 1B in which like elements are labeled with like reference numbers, a converter 80 includes a controller 82 having a timer 84 with which regulation can be monitored. With the arrangement of FIG. 1B, the pre-regulation interval during which the high side switch 28 is disabled is established by the timer 84. Converter 80 can be substantially similar to converter 10 except that regulation monitor 44 (FIG. 1) is implemented using the timer 84.

Timer 84 can be responsive to a timer selection signal TSEL 86 and is configured to generate a signal PRDONE that is indicative of completion of the pre-regulation interval. More particularly, in operation, timer 84 maintains a count based on the selected timer selection signal 86 and, when the timer times out (i.e., when the count value is reached), the PRDONE signal can change state to indicate that the converter output 24 is within regulation.

The timer selection signal TSEL 86 can be a preset or predetermined or programmable signal by which the duration of the pre-regulation interval can be selected. For example, in some embodiments, the timer selection signal 86 can be selected from between two or more possible durations, such as from among four durations ranging between 5 ms to 20 ms.

Figure 1C:
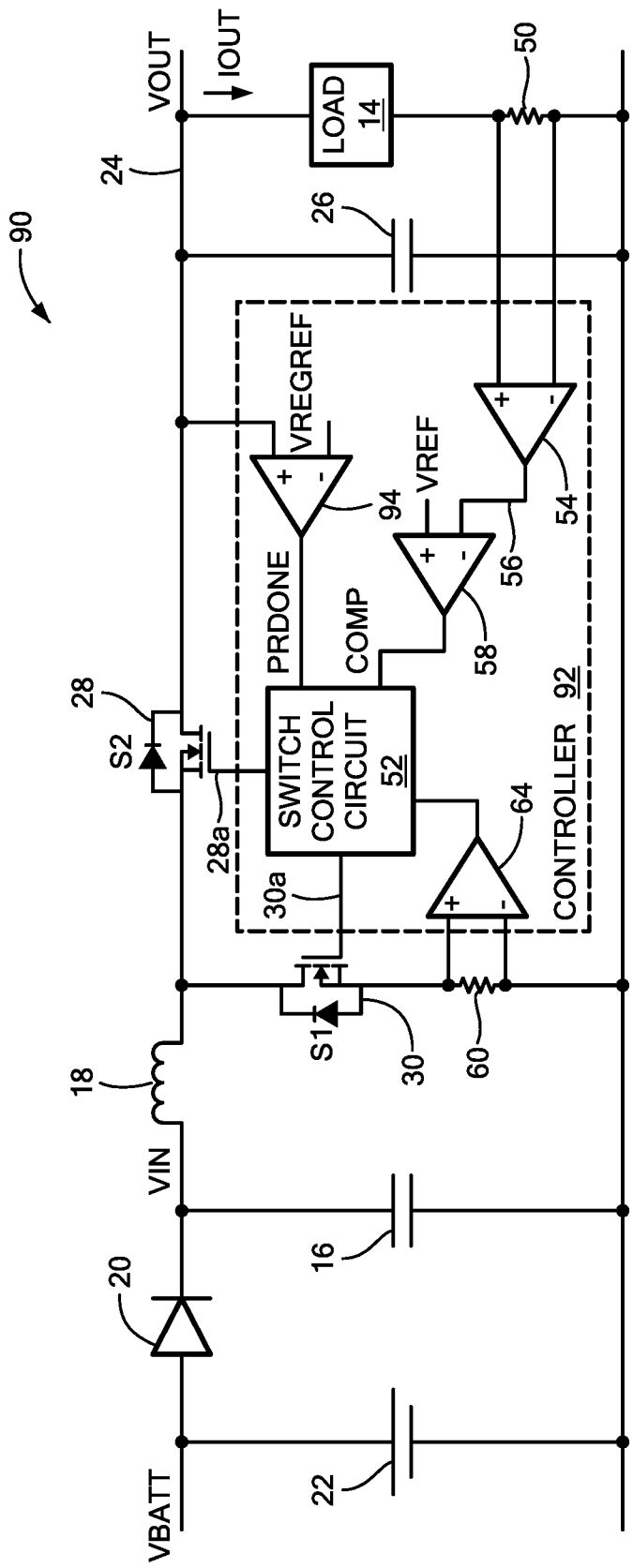
FIG. 1C is a simplified block diagram of an embodiment of the converter of FIG. 1 according to the disclosure.

Referring also to FIG. 1C in which like elements are labeled with like reference numbers, a converter 90 includes a controller 92 having a comparator 94 with which regulation can be monitored. With the arrangement of FIG. 1C, the pre-regulation interval during which the high side switch 28 is disabled is established by the comparator 94. Converter 90 can be substantially similar to converter 10 except that regulation monitor 44 (FIG. 1) is implemented using the comparator 94.

Comparator 94 can be responsive to the output voltage VOUT and a regulation reference voltage VREGREF and is configured to compare these voltage levels in order to generate a signal PRDONE that is indicative of completion of the pre-regulation interval. More particularly, in operation, if the output voltage VOUT is greater than the regulation reference voltage VREGREF, then the comparator output signal PRDONE can be at a first logic level to indicate that the output is not within regulation; whereas, if the output voltage VOUT is less than the regulation reference voltage VREGREF, then the comparator output signal PRDONE can transition to a second logic level to indicate that the converter output 24 is within regulation.

The regulation reference voltage VREGREF can be preset or predetermined or can be user programmable. In general, the VREGREF voltage is selected to establish the level of the output voltage VOUT that is considered to be within regulation for a given application.

It will be appreciated by those of ordinary skill in the art that although each of the converters 10, 70, 80, and 90 of respective FIGS. 1, 1A, 1B, and 1C is shown to include a different technique for determining when the converter is within regulation, in some embodiments, a converter can employ more than one such technique, such as for redundancy reasons.

Figure 2:
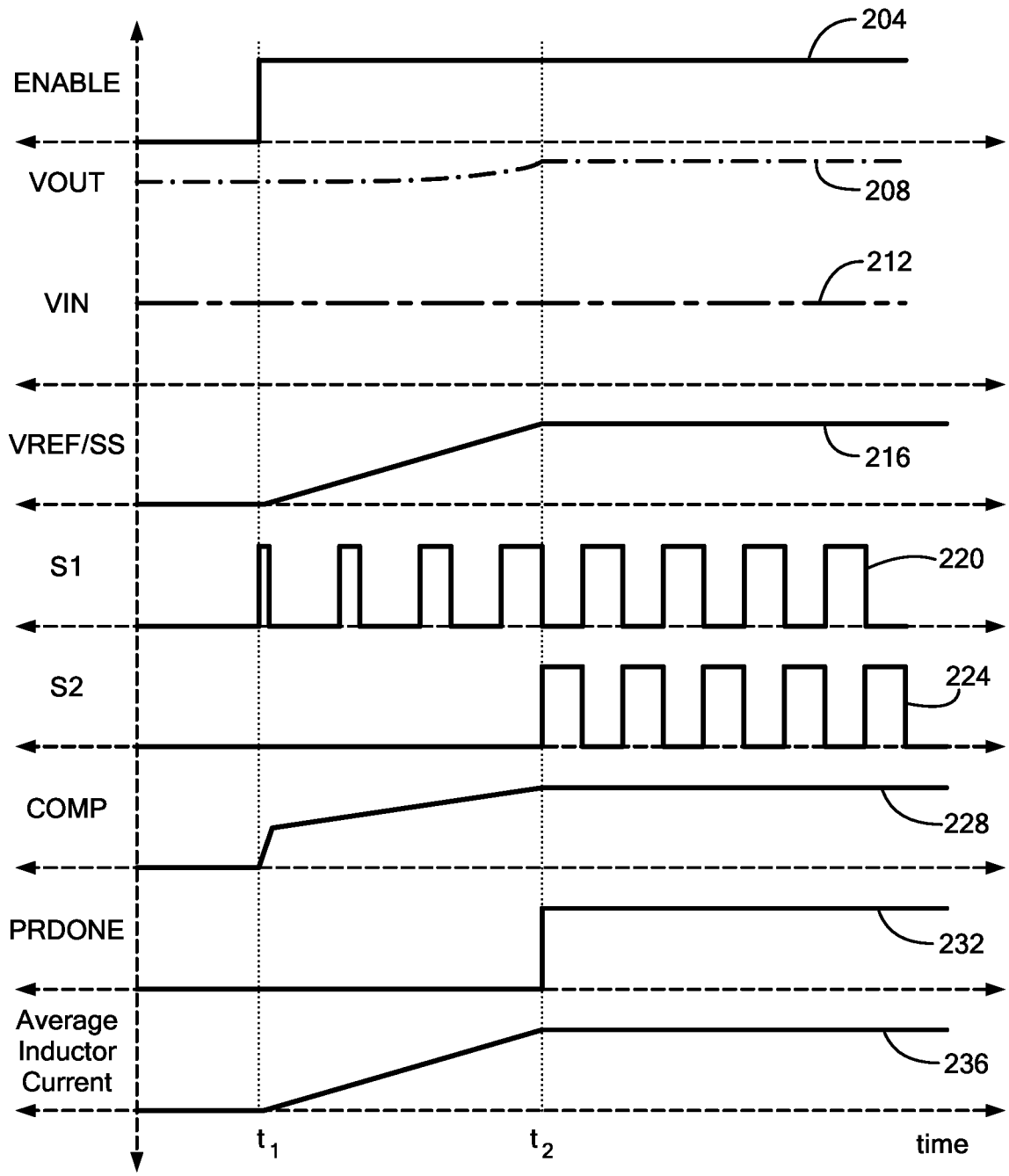
FIG. 2 shows various example waveforms associated with the converters of FIGS. 1, 1A, 1B, and 1C.

Referring also to FIG. 2, example waveforms associated with any of the converters of FIGS. 1-1C are provided to illustrate aspects of its operation. An enable signal 204 transitions at a time t1 to indicate the beginning of operation of the converter. For example, upon a transition of the enable signal 204, soft start circuit 72 (FIG. 1A) can commence operation as illustrated by the SS signal 216 (which can be the same as or similar to the VREF signal of FIGS. 1, 1B, and 1C) and the low side switch 30 begins to switch. Input voltage VIN 212 is at a nominal voltage level as provided by voltage source 22.

In the example waveforms, the output voltage VOUT 208 is at a pre-charged, or pre-biased level when the converter starts to switch at time t1. This pre-biased condition in which the output voltage 208 is greater than the input voltage 212 can occur when the converter is turned on for a second or subsequent time for example. It will be appreciated that if the converter were operated in a synchronous manner beginning at time t1, the average inductor current could go negative and a path for reverse current flow from the converter output to the input capacitor would exist through the high side switch 28 under such pre-biased conditions. Such reverse current flow can cause undesirable voltage spikes on the input voltage that can be large enough to trigger an overvoltage fault.

According to the disclosure, the high side switch 28 is disabled during the pre-regulation interval that commences at time t1 in order to thereby prevent the reverse current flow. The pre-regulation interval is completed at time t2 as illustrated by a transition of the example PRDONE signal 232. As explained above, the PRDONE signal 232 can be generated by regulation monitor 44 (FIG. 1), soft start circuit 72 (FIG. 1A), timer 84 (FIG. 1B), or comparator 94 (FIG. 1C).

FIG. 2 includes example waveforms for the low side switch control signal 220 (corresponding to signal 30a), the high side switch control signal 224 (corresponding to signal 28a), the VREF/SS signal 216 (corresponding to the VREF voltage in FIGS. 1, 1B, and 1C and to the SS signal of FIG. 1A), and the COMP signal 228 (corresponding to the output signal of the error amplifier 58). The low side switch 30 is enabled at time t1 in response to the transition of the enable signal 204. As the VREF/SS signal 216 gradually rises, the duty cycle of the enabled low side switch 220 increases and the COMP signal increases, as shown. The average inductor current 236 also increases starting at time t1, as shown.

At time t2, when the pre-regulation interval is complete, the high side switch 28 is enabled as shown by the high side switch control signal 224. Since the output voltage is in regulation when the high side switch 28 is enabled, there is no reverse current flow. Thus, starting at time t2, the converter is operated in a synchronous mode and thereby benefits from increased efficiency operation under conditions that do not give rise to reverse current flow.

Figure 3:
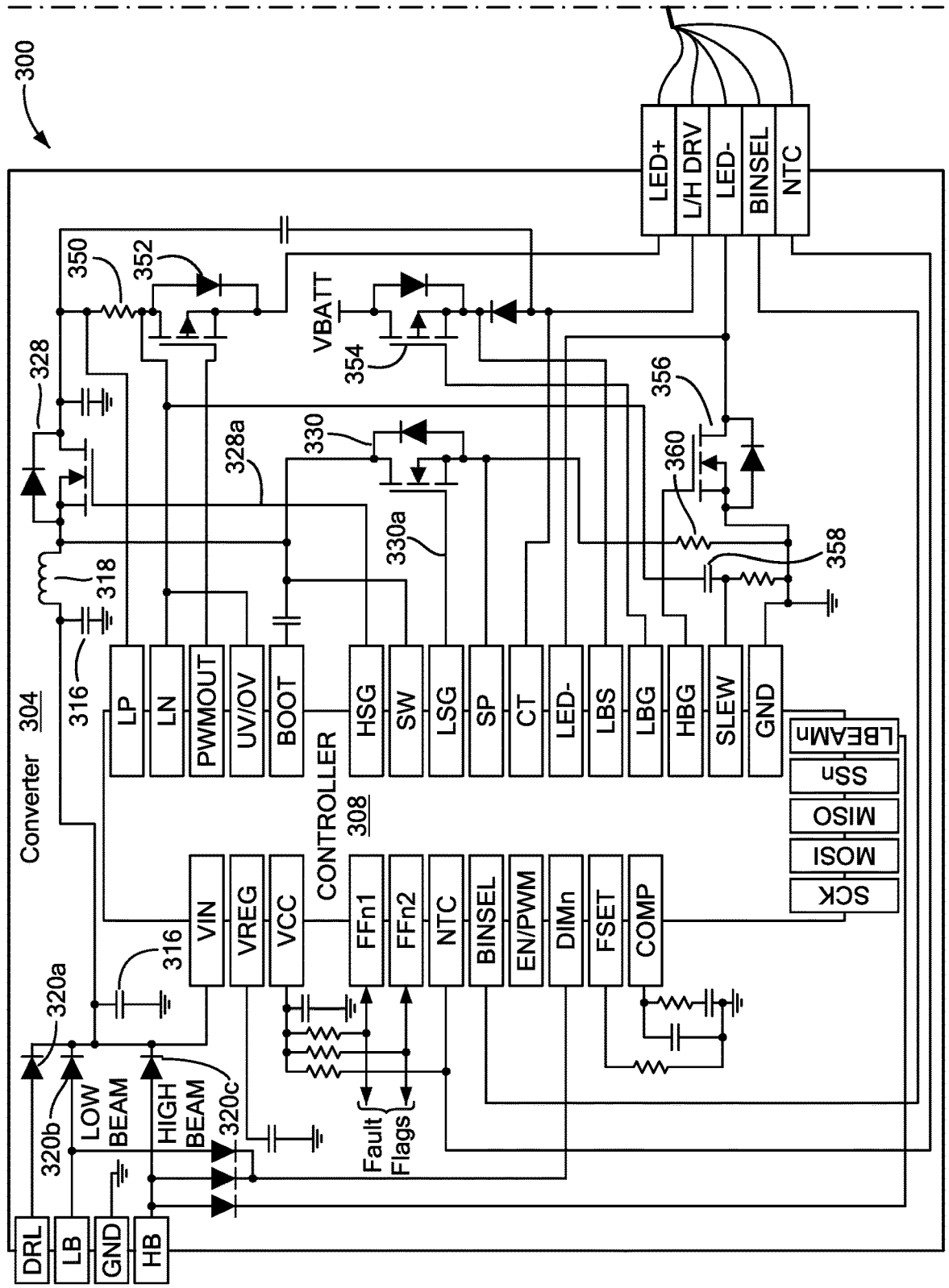
FIG. 3 is a schematic of an application system for the converter of FIG. 1A including a controller according to the disclosure.
Figure 3:
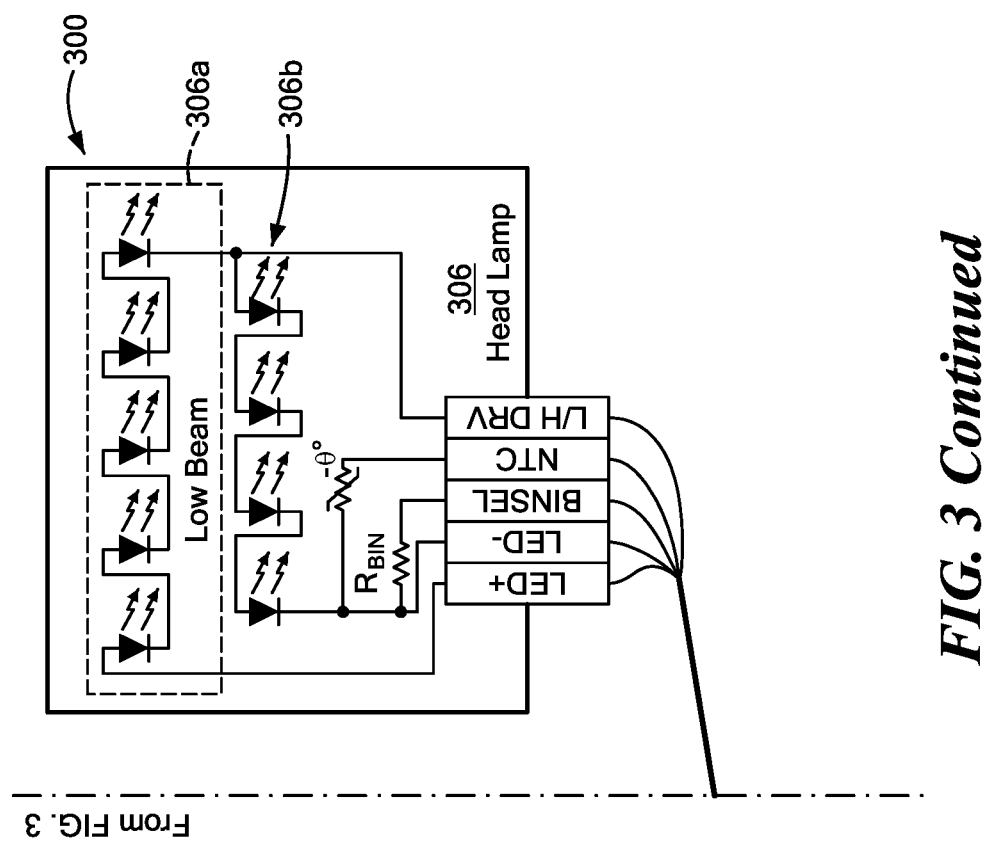

Referring also to FIG. 3, an example application system 300 for use with any of the converters of FIGS. 1-1C is shown to include a converter 304 and a load 306, here in the form of a head lamp as may be for automotive applications. Converter 304 includes a controller 308 that can be the same as or similar to controller 66 of FIG. 1A, in which the pre-regulation interval is established by a soft start feature, and further includes other converter components. The example controller 308 can be provided in the form of an integrated circuit having pins, terminals, or connections as labeled.

Converter 304 can be coupled to receive a supply voltage from a power supply (not shown) through terminals DRL, LB, HB, and GND and is configured to generate an output voltage and output current at terminals LED+, LED. Supply voltage input terminals can correspond to a daytime running light (DRL) mode in which a PWM dimming feature is used and a low beam (LB) mode and a high beam (HB) mode in which PWM dimming is at 100%. By providing the DRL, LB, and HB terminals, there is no need to design a different converter for different applications. Converter elements of system 300 can include high side switch 328, low side switch 330, and inductor 318, which can be the same as or similar to respective elements 28, 30, and 18 of FIGS. 1-1C. Controller 308 is configured to generate control signals 328a, 330a for the high side switch 328 and the low side switch 330 in the above-described manner, whereby during a pre-regulation interval, the high side switch 328 is disabled and thereafter once the pre-regulation interval is complete, both switches 328, 330 are enabled to commence synchronous operation.

Diodes 320a, 320b, 320c are coupled between the power supply terminals and one or more input capacitors 316 that can be the same as or similar to input capacitor 16 of FIG. 1. Diodes 320a, 320b, 320c provide reverse current protection for the power supply such that, if conditions result in a reverse current flow from the converter output to the input, diodes 320a, 320b, 320c would become reverse-biased and prevent the current from reaching the power supply.

Reverse current flow to the input capacitor 316 and input terminal VIN of the controller 308 is prevented by disabling the high side switch 328 under conditions (i.e., during the pre-regulation interval) when such reverse current could otherwise flow. Details of controller 308 by which gate drive signals 328a, 330a are generated at respective controller terminals HSG, LSG are described below in connection with FIG. 4. Suffice it to say here that converter 304 can include current sensor resistor 350 (that can be the same as or similar to resistor 50 of FIG. 1) for coupling in series with the load 306 and to LP, LN controller terminals. A further sense resistor 360 (that can be the same as or similar to resistor 60 of FIG. 1) can be coupled in series with low side switch 330 and to an SP controller terminal for use in connection with an inner control loop.

Converter 304 can be configurable to operate in different topologies, such as a Boost topology, a Buck Boost topology, or a SEPIC topology in order to accommodate various loads and applications. To this end, converter 304 can include additional MOSFETs 354, 356 and controller 308 can include switch connections to facilitate converter configuration for low-beam and high-beam modes of operation. For example, a PMOS FET 354 can be arranged have its gate connected to an LBG terminal, its source connected to an LBS terminal, and its drain connected to the input voltage, VIN. The high-beam NMOS FET 356 can be arranged to have its gate connected to a HBG terminal, its source connected to GND, and its drain connected to the bottom of the LED string.

The example head lamp load 306 includes a plurality of series-coupled light emitting diodes (LEDs) and can be configurable to operate in a low beam mode in which a first plurality of LEDs 306a are coupled to the converter or in a high beam mode in which the first plurality of LEDs 306a and a series-coupled second plurality of LEDs 306b are coupled to the converter. In the low beam configuration, controller 308 can be configured to operate in the Buck Boost topology and in the high beam configuration, controller 308 can be configured to operate in the Boost topology. To this end, an LBEAMn terminal can be configured to receive a control signal with which high beam or low beam operation is selected. Controller 308 can include a SLEW terminal for coupling to sense resistor 350 through an RC network 358 in order to permit customizing the slew rate in order to minimize the LED current overshoot and undershoot while transitioning between low-beam and high-beam operation.

Figure 4:
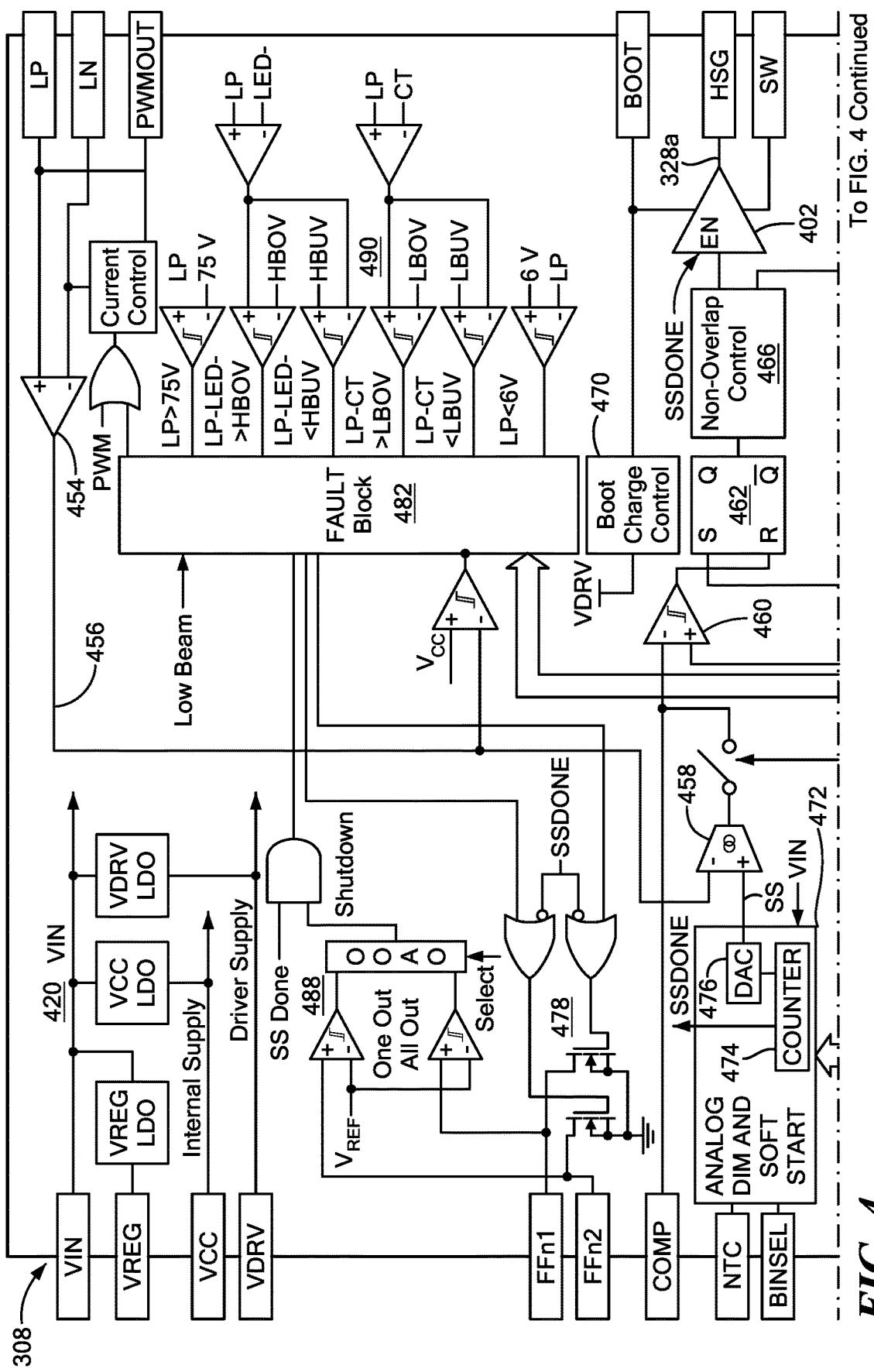
FIG. 4 is a block diagram of the controller of FIG. 3.
Figure 4:
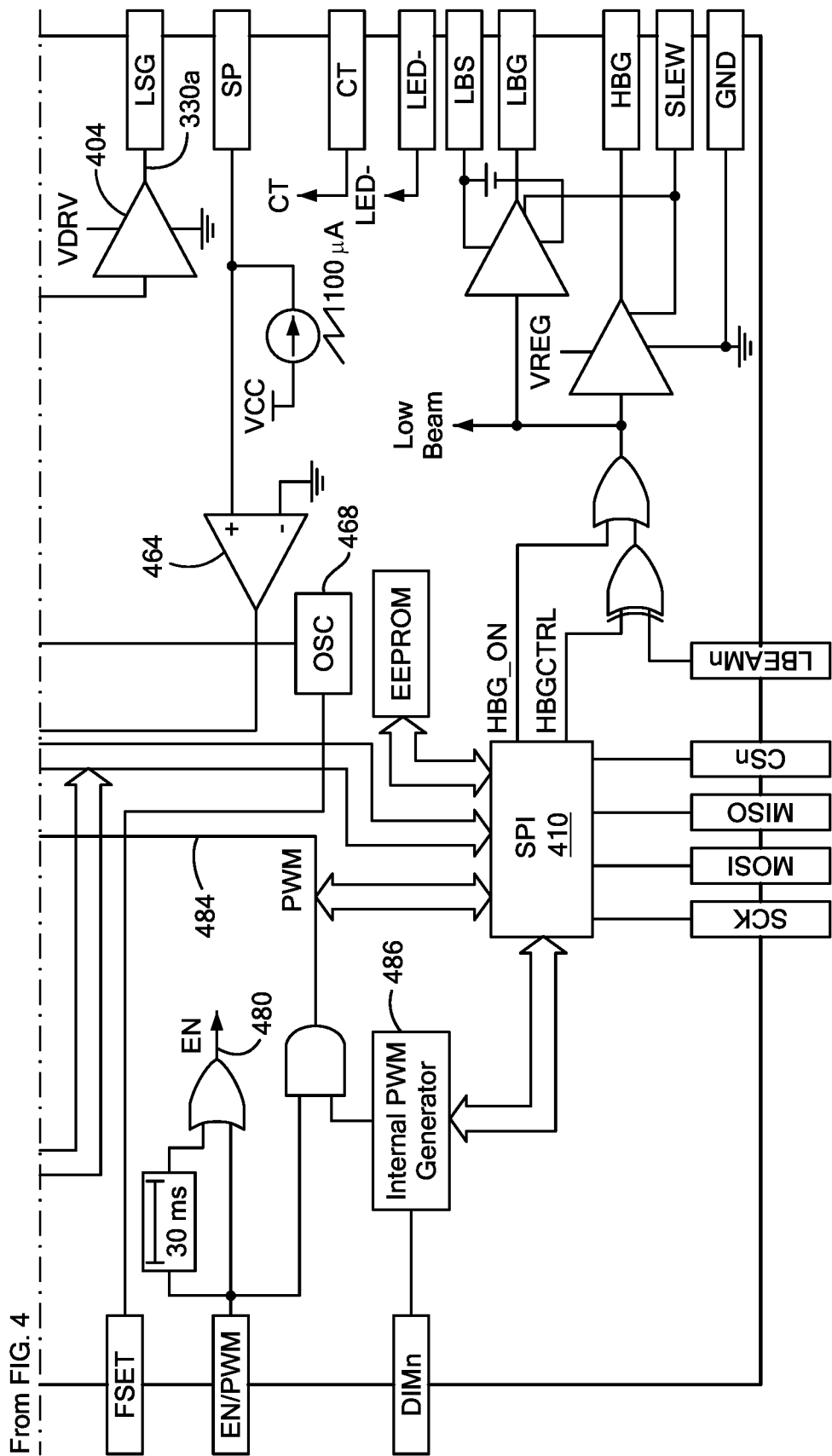

Referring also to FIG. 4, controller 308 includes circuitry to generate the high side control signal 328a and the low side control signal 330a. To this end, a high side gate driver 402 can provide the high side control signal 328a at the HSG terminal and a low side gate driver 404 can provide the low side control signal 330a at the LSG terminal. The high side driver 402 can receive an input signal SSDONE as will be explained. The illustrated controller 308 can utilize current mode control and include an error amplifier 458 having a non-inverting input responsive to a soft start signal SS and an inverting input coupled to receive a load current feedback signal 456 from a current sense amplifier 454. Amplifier 454 can be coupled across load current sense resistor 350 (FIG. 3). A boot charge control circuit 470 can be coupled to the high side driver 402 and to a BOOT terminal and can be used with a SW terminal to supply the high side NMOS switch 328 with a voltage higher than the input voltage.

An output of error amplifier 458 can be selectively coupled to provide the COMP signal to switch control circuitry, including an amplifier 460, an amplifier 464, a latch 462, and a non-overlap control circuit 466. Amplifier 464 can be the same as or similar to amplifier 64 of FIG. 1 and thus, can be coupled to inner control loop sense resistor 360 (FIG. 3). The inner control loop can detect peak current through low side switch 330 to determine duty cycle for the converter and cycle-by-cycle current limit. The inner control loop can further implement slope compensation to prevent harmonic oscillations at certain duty cycles. An output of inner control loop amplifier 464 can be coupled to amplifier 460 that is further coupled to receive the COMP signal, as shown. An output of amplifier 460 is coupled to a reset input of latch 462. A set input of latch 462 receives an oscillator signal from an oscillator 468. An external input can be provided at an FSET terminal of the controller 308 to set the switching frequency of the converter. An output of latch 462 is coupled to a non-overlap control circuit 466 that functions to ensure sufficient dead time between conduction of the high side switch 328 and the low side switch 330 in order to prevent shoot through.

A soft start circuit 472 is responsive to a regulation control signal at a BINSEL terminal that can be the same as or similar to signal 76 of FIG. 1A and can be used to select the converter output range. Soft start circuit 472 can be further responsive to a temperature signal at an NTC terminal with which the output current IOUT can be scaled based on temperature.

Soft start circuit 472 includes a counter 474 and a DAC 476 and is configured to generate a soft start SS signal for coupling to the error amplifier 458 and an SSDONE signal that indicates the state of the soft start circuit (i.e., whether the soft start interval is active or not). Upon power up of the converter 300, the SSDONE signal can be at a logic level to indicate that the soft start circuit is active (e.g., at a logic low level). Once the soft start interval is completed, the SSDONE signal can transition to a second logic level (e.g., a logic high level).

Counter 474 can be set to a predetermined count value that is established by a soft start selection signal that can be preset or user programmable. The counter output is converted into a analog signal by the DAC 476 and coupled to the error amplifier 458 as the reference voltage SS. In operation, the reference voltage gradually increases during the soft start interval. Once the counter 474 reaches the count value (i.e., times out), the SSDONE signal transitions (e.g., to a logic high level) to indicate the end of the soft start interval.

The SSDONE signal is coupled to the high side gate driver 402 to provide enable functionality such that the high side driver is disabled until the SSDONE signal transitions to indicate the end of the soft interval. In this way, the SSDONE signal is used to establish the pre-regulation interval during which the high side switch 328 is disabled. When the soft start circuit 472 is reset for any reason (e.g., a power on reset as can occur when a fault is detected), the SSDONE signal is likewise reset in order to again disable the high side gate driver 402.

The SSDONE signal also can be used to gate certain fault reporting and one-out-all-out circuitry. To this end, the SSDONE signal can be coupled to fault detection circuitry 478 with which various faults detected by a fault block 482 are reported at FFn1, FFn2 terminals of the controller 308. A one-out-all-out feature can be implemented with circuitry 488 with which the converter 304 can be shut down in response to detection of an undervoltage event. In some embodiments, if the one-out-all-out feature is disabled, the converter 304 can continue operation and the head lamp 306 can operate with reduced light output. The fault block 482 can be responsive to various comparator output signals from comparators 490 in order to thereby determine undervoltage and overvoltage conditions. For example, comparators 490 can detect the converter output voltage at controller terminal LP with reference to the voltage at the LED-terminal and at a CT terminal, as shown.

It will be appreciated by those of ordinary skill in the art that various circuitry and techniques can be used to implement the soft start circuit 72. For example, a constant current flowing into a capacitor to generate a voltage that can be compared to a reference voltage by a comparator can be used to implement a soft start feature.

Converter 304 can include various features. For example, switching operation can commence based in part on an external signal applied to an EN/PWM terminal. Following a predetermined time interval, an enable signal EN 480 can transition to initiate operation of soft start circuit 472. The enable signal 480 can be the same as or similar to the enable signal 204 (FIG. 2). The output current IOUT can be modulated by an internal PWM signal 484 or an external PWM signal for direct PWM control on the EN/PWM terminal. PWM signal 484 can be generated based on a logic combination of the external signal applied to the EN/PWM input and an internal PWM generator 486. PWM generator 486 can receive an external signal at a DIMn input with which a selection can be made between external or internal dimming. When external dimming is enabled, a PWM signal can be provided at a PWMOUT terminal to control a dimming transistor 352 with which the current through the LEDs 306 is turned on or off (FIG. 3).

Interface with the controller 308 can be implemented with various circuitry, techniques, and/or communication protocols. The example controller 308 includes a Serial Peripheral Interface (SPI) interface 410 including a three-wire synchronous serial interface and a fourth wire can be used to provide diagnostic feedback and read back of the register content. As non-limiting examples, LED brightness can be controlled by the internal PWM signal via SPI and the strength of the PWM MOSFET driver can be controllable via SPI to customize the PWM slew rate. Further, diagnostics can be reported through SPI. The SPI interface 410 also can be used to control configuration options.

Controller 308 can include one or more regulators 420 including a linear regulator to generate a regulated voltage at a VREG terminal and other regulators to generate regulated supply voltages for internal circuitry, such as the VIN regulated voltage and a regulated voltage VDRV for gate drive circuitry.

As used herein, the terms "processor" and "controller" are used to describe electronic circuitry that performs a function, an operation, or a sequence of operations. The function, operation, or sequence of operations can be hard coded into the electronic circuit or soft coded by way of instructions held in a memory device. The function, operation, or sequence of operations can be performed using digital values or using analog signals. In some embodiments, the processor or controller can be embodied in an application specific integrated circuit (ASIC), which can be an analog ASIC or a digital ASIC, in a microprocessor with associated program memory and/or in a discrete electronic circuit, which can be analog or digital. A processor or controller can contain internal processors or modules that perform portions of the function, operation, or sequence of operations. Similarly, a module can contain internal processors or internal modules that perform portions of the function, operation, or sequence of operations of the module.

It will be appreciated by those of ordinary skill in the art that the illustrated delineation of blocks and their functionality are illustrative only and that implementation of the stall detector 30 can be varied according to design considerations. Further, while electronic circuits shown in figures herein may be shown in the form of analog blocks or digital blocks, it will be understood that the analog blocks can be replaced by digital blocks that perform the same or similar functions and the digital blocks can be replaced by analog blocks that perform the same or similar functions. Analog-to-digital or digital-to-analog conversions may not be explicitly shown in the figures, but should be understood.

Figure 5:
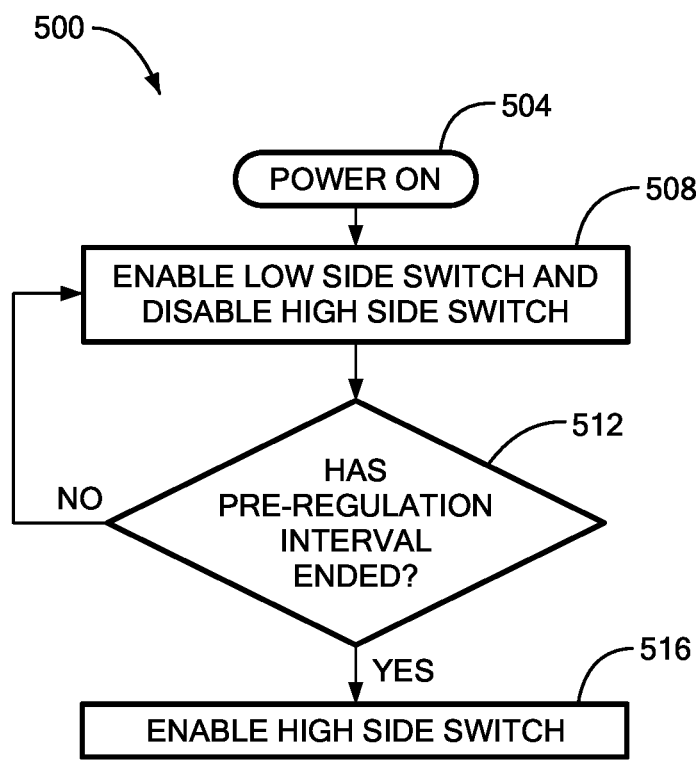
FIG. 5 is a flow diagram illustrating a method for controlling the converters of FIGS. 1, 1A, 1B, and 1C.

Referring also to FIG. 5, a flow diagram of a method 500 for controlling a synchronous converter (e.g., converter 10) having a high side switch and a low side switch commences at block 504 following which the low side switch is enabled and the high side switch is disabled at block 508. As explained above, the high side switch can be disabled by disabling the gate driver that generates the switch control signal.

The converter is operated in this fashion (with the high side switch disabled) until a pre-regulation interval is completed as may be determined by the schemes of FIGS. 1-1C, for example. In particular, determination of completion of the pre-regulation interval can be based on a soft start circuit, a timer, or a comparator configured to compare a regulation reference voltage to the regulated converter output.

At block 512, it is determined whether or not the pre-regulation interval is completed (i.e., whether or not the converter has reached regulation). If it is determined that the pre-regulation interval is complete, then block 516 is performed in which the high side switch is enabled in order to thereby commence synchronous operation. If however, the pre-regulation interval is not complete, then block 512 is repeated until the converter is in regulation.

It will be appreciated that the rectangular elements are herein denoted "processing blocks" and the diamond-shaped elements are herein denoted "decision blocks" and either or both may represent computer software instructions or groups of instructions. It should be noted that the flow diagram of FIG. 5 represents an example embodiment disclosed herein and variations which generally follow the process outlined, are considered to be within the scope of the concepts, systems and techniques described and claimed herein. Some or all of the blocks may represent operations performed by functionally equivalent circuits. Also, some blocks may be manually performed while other blocks may be performed by machine. The flow diagram does not depict the syntax of any particular programming language. Rather, the flow diagram illustrates the information one of ordinary skill in the art requires to fabricate circuits and/or to generate computer software to perform the processing required of the particular apparatus. It should be noted that many routine program elements, such as initialization of loops and variables and the use of temporary variables are not shown. It will be appreciated by those of ordinary skill in the art that unless otherwise indicated herein, the particular sequence described is illustrative only and in instances can be varied without departing from the spirit of the concepts described and/or claimed herein. Thus, unless otherwise stated, the processes described below are unordered meaning that, when possible, the actions shown in the diagrams can be performed in any convenient or desirable order, including simultaneously.

All references cited herein are hereby incorporated herein by reference in their entirety.

Having described preferred embodiments, it will now become apparent to one of ordinary skill in the art that other embodiments incorporating their concepts may be used. Elements of different embodiments described herein may be combined to form other embodiments not specifically set forth above. Various elements, which are described in the context of a single embodiment, may also be provided separately or in any suitable subcombination. Other embodiments not specifically described herein are also within the scope of the following claims. For example, while a three-phase motor is described, the described principles and techniques apply to an electric motor having more than or fewer than three phases.

It is felt therefore that these embodiments should not be limited to disclosed embodiments, but rather should be limited only by the spirit and scope of the appended claims.

What is claimed is:

1. A converter to convert an input voltage into a regulated output current for supplying a load, comprising:
    a reverse current protection diode having an anode coupled to the input voltage and a cathode;
    an energy storage element coupled to the cathode of the reverse current protection diode;
    a high side transistor coupled to the energy storage element and responsive to a high side control signal;
    a low side transistor coupled to the energy storage element and responsive to a low side control signal; and
    a controller configured to generate the high side control signal and the low side control signal, wherein the low side transistor is enabled and the high side transistor is disabled during a pre-regulation interval during which the output current is not within a specified regulation range.

2. The converter of claim 1 wherein the controller is further configured to enable the high side transistor during a synchronous operational mode following the pre-regulation interval.

3. The converter of claim 1 wherein the controller is further configured to generate a signal indicative of completion of the pre-regulation interval.

4. The converter of claim 3 wherein the controller further comprises a high side gate driver to generate the high side control signal in response to the signal indicative of completion of the pre-regulation interval.

5. The converter of claim 1 wherein the controller comprises a soft start circuit configured to generate a soft start signal and wherein the soft start circuit is configured to establish the pre-regulation interval.

6. The converter of claim 5 wherein the controller is responsive to the soft start signal to generate the high side control signal and the low side control signal.

7. The converter of claim 5 wherein the controller further comprises an error amplifier having a first input coupled to receive the soft start signal, a second input coupled to receive a feedback signal indicative of the regulated output current, and an output at which a COMP signal is generated for use by the controller to generate the high side control signal and the low side control signal.

8. The converter of claim 5 wherein the soft start circuit comprises a counter and a digital-to-analog converter, wherein the counter is responsive to a soft start selection signal and generates a count signal coupled to the digital-to-analog converter, and wherein the soft start signal is provided at an output of the digital-to-analog converter.

9. The converter of claim 8 wherein the soft start selection signal is user programmable.

10. The converter of claim 1 wherein the controller is configured to generate the high side control signal and the low side control signal based on a selected one of a Boost topology or a Buck Boost topology.

11. The converter of claim 10 wherein the load is configurable between a first configuration for which the Boost topology is selected or a second configuration for which the Buck Boost topology is selected.

12. The converter of claim 1 wherein the controller comprises a timer configured to establish the pre-regulation interval.

13. The converter of claim 1 wherein the controller comprises a comparator having a first input coupled to a regulation reference voltage, a second input coupled to receive a signal indicative of the regulated output current, and an output at which a comparator output signal is provided, wherein the comparator output signal is configured to establish the pre-regulation interval.

14. A controller configured to control a high side transistor and a low side transistor of a converter that converts an input voltage into a regulated output current, the controller comprising: a switch control circuit comprising a high side gate driver to generate a control signal for the high side transistor and a low side gate driver to generate a control signal for the low side transistor; and a circuit configured to establish a pre-regulation interval during which the output current is not within a specified regulation range, wherein the low side transistor is enabled and the high side gate driver is disabled in order to thereby disable the high side transistor during the pre-regulation interval.

15. The controller of claim 14 wherein the controller is further configured to enable the high side transistor during a synchronous operational mode following the pre-regulation interval.

16. The controller of claim 14 wherein the circuit is further configured to generate a signal indicative of completion of the pre-regulation interval for coupling to the high side gate driver.

17. The controller of claim 14 wherein the circuit comprises a soft start circuit configured to generate a soft start signal to establish the pre-regulation interval.

18. The controller of claim 17 wherein the switch control circuit further comprises an error amplifier having a first input coupled to receive the soft start signal, a second input coupled to receive a feedback signal indicative of the regulated output current, and an output at which a COMP signal is generated for use by the switch control circuit to generate the control signal for the high side transistor and the control signal for the low side transistor.

19. The controller of claim 17 wherein the soft start circuit comprises a counter and a digital-to-analog converter, wherein the counter is responsive to a soft start selection signal and generates a count signal coupled to the digital-to-analog converter, and wherein the soft start signal is provided at an output of the digital-to-analog converter.

20. The controller of claim 19 wherein the soft start selection signal is user programmable.

21. The controller of claim 14 wherein the circuit comprises a timer configured to establish the pre-regulation interval.

22. The controller of claim 14 wherein the circuit comprises a comparator having a first input coupled to a regulation reference voltage, a second input coupled to receive a signal indicative of the regulated output current, and an output at which a comparator output signal is provided, wherein the comparator output signal is configured to establish the pre-regulation interval.

23. A method for controlling a synchronous converter having a high side switch and a low side switch for converting an input voltage to a regulated converter output, comprising:

enabling the low side switch during a pre-regulation interval corresponding to the synchronous converter output not being in a regulation condition;

disabling the high side switch during the pre-regulation interval;

determining completion of the pre-regulation interval; and enabling the high side switch based on the determination of the completion of the pre-regulation interval.

24. The method of claim 23 wherein disabling the high side switch during the pre-regulation interval comprises disabling a gate driver that generates a control signal for the high side switch.

25. The method of claim 23 wherein determining completion of the pre-regulation interval comprises using a soft start circuit.

26. The method of claim 23 wherein determining completion of the pre-regulation interval comprises using a timer.

27. The method of claim 23 wherein determining completion of the pre-regulation interval comprises using a comparator configured to compare a regulation reference voltage to the regulated converter output.

* * * * *